(12) United States Patent
Taft

(10) Patent No.: US 6,169,537 B1
(45) Date of Patent: *Jan. 2, 2001

(54) INPUT DEVICE WITH HANDLE

(75) Inventor: Frederick Denham Taft, Corvallis, OR (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/196,931

(22) Filed: Feb. 14, 1994

(51) Int. Cl.[7] ........................................ G09G 5/08
(52) U.S. Cl. ......................... 345/163; 345/156; 345/157; 345/161
(58) Field of Search .................... 345/156, 157, 345/161, 163, 164, 165, 166; 74/471 XY; 200/6 A; 16/110 R, 115

(56) References Cited

U.S. PATENT DOCUMENTS

| 3,854,131 | * | 12/1974 | Vanderheiden | 345/163 |
| 4,234,202 | * | 11/1980 | Loffelholz | 280/820 |
| 4,759,431 | * | 7/1988 | King | 190/18 A |
| 4,769,517 | * | 9/1988 | Swinney | 345/156 |
| 4,780,707 | * | 10/1988 | Selker | 345/163 |
| 4,862,165 | * | 8/1989 | Gart | 345/163 |
| 5,012,048 | * | 4/1991 | McGonigal | 345/157 |
| 5,132,672 | * | 7/1992 | Clark | 345/164 |
| 5,311,208 | * | 5/1994 | Burger | 345/157 |
| 5,355,147 | * | 10/1994 | Lear | 345/163 |
| 5,434,594 | * | 7/1995 | Martinelli et al. | 345/163 |

FOREIGN PATENT DOCUMENTS

| 126727 | * | 6/1985 | (JP) | 345/163 |
| 60-126727 |  | 7/1985 | (JP) | G06F 3/03 |

* cited by examiner

Primary Examiner—Kent Chang
(74) Attorney, Agent, or Firm—Curtis G. Rose

(57) ABSTRACT

An input device, such as a mouse, has a base unit movable in an x direction and a y direction. Inside this base unit is a position detection mechanism which detects movement of the base unit. A handle is attached to the top of the base unit. The handle has sufficient length and width to accommodate the fingers of a human hand curled about it, and has an adjustable length, width, and orientation. After adjustment and during normal operation, the handle does not move in any direction independent of movement of the base unit. The handle has one or more switches on it. Each of the switches is positioned for activation by a different finger of a human hand curled about it.

22 Claims, 4 Drawing Sheets

INPUT DEVICE WITH HANDLE

FIELD OF THE INVENTION

This invention relates to the electronics circuitry field. More particularly, this invention is an ergonomically designed input device, such as a mouse, with a handle.

BACKGROUND OF THE INVENTION

The traditional way of inputting data into a computer has changed dramatically over the years. Punched cards read through a card reader thankfully gave way to a computer keyboard styled upon a typewriter keyboard. While the keyboard is still the primary way of inputting textual data into a computer, the computer mouse has emerged as a complementary input device, especially useful in navigating around a graphical user interface such as that employed by Apple computers, IBM-Compatible computers running Microsoft Windows, and many types and styles of UNIX-based workstations.

The intuitive nature and ease of use of these graphical user interfaces have made them extremely popular with computer users. This popularity has resulted in a dramatic increase in the use of the computer mouse and a corresponding decrease in the use of the keyboard. For an ever increasing number of users, the mouse is now used much more often than the keyboard. When one factors in the increasing number of useful applications now present on these computers, it is not uncommon for a computer mouse to be used for several hours at a time during a typical computing day.

This dramatic increase of use for computer mice has not been without its problems. One problem of particular concern is the awkward and unnatural hand position required to hold and control a computer mouse. While this awkward and unnatural hand position does not normally cause any real discomfort if a mouse is used a few minutes at a time, it can cause great discomfort if a mouse is used for hours at a time. In extreme instances, serious hand and/or wrist injury, such as the infamous and debilitating carpel tunnel syndrome, can be the result.

Computer mouse manufacturers have attempted to address this problem by making their mice more ergonomic. While some small improvements have been made, today's computer mouse remains ergonomically deficient.

SUMMARY OF THE INVENTION

An input device, such as a mouse, has a base unit movable in an x direction and a y direction. Inside this base unit is a position detection mechanism which detects movement of the base unit. A handle is attached to the top of the base unit. The handle has sufficient length and width to accommodate the fingers of a human hand curled about it, and has an adjustable length, width, and orientation. After adjustment and during normal operation, the handle does not move in any direction independent of movement of the base unit. The handle has one or more switches on it. Each of the switches is positioned for activation by a different finger of a human hand curled about it.

DETAILED DESCRIPTION OF THE PREFERRED EMBODIMENT

Figure 1:
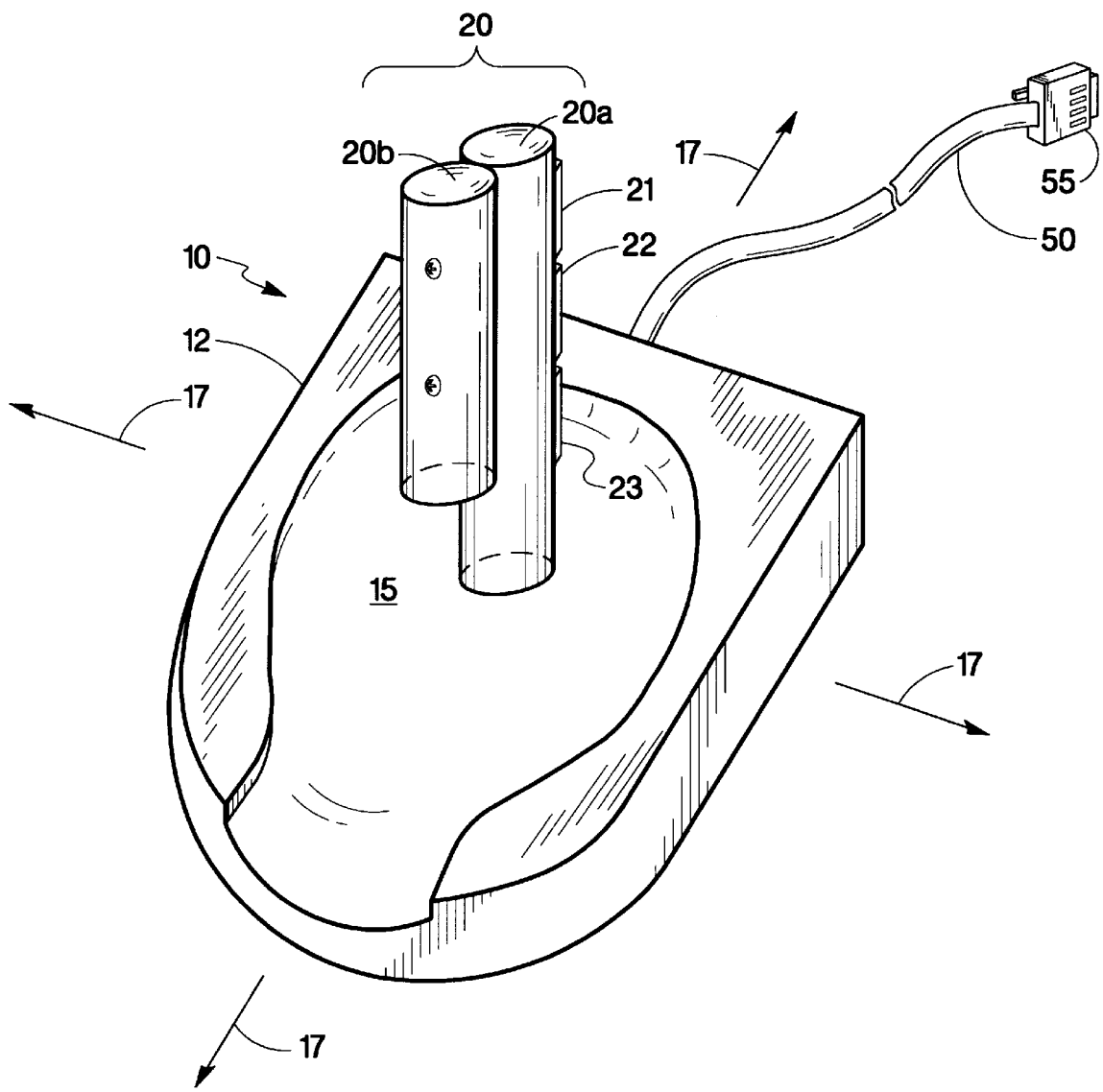
FIG. 1 shows a perspective view of the input device of the preferred embodiment of the invention.

FIG. 1 shows a perspective view of the input device of the preferred embodiment of the invention. Device 10 contains base unit 12. Like a conventional mouse, Base unit 12 is movable in the x and y directions, as is shown by arrows 17. Cable 50 is secured at one end to base unit 12, and has connector 55 at the other end. In the preferred embodiment, connector 55 is a standard 6 pin mini-DIN bus connector pluggable into the system unit of a computer (not shown), although other types of connectors, and other types of electronic devices other than computers, could also be used. In an alternate embodiment, input device 10 communicates with an electronic device (such as a computer) via infrared transmission, such as via the industry standard Serial Infrared (SIR) protocol. In this embodiment, cable 50 and connector 55 are replaced by a conventional infrared transmitter/receiver.

Handle 20 is attached to the top of base unit 12 in a substantially perpendicular manner. Handle 20 has sufficient length to accommodate the fingers of a human hand curled about it. As will be described in more detail later, handle 20 has an adjustable length, width, and orientation. Unlike a conventional joystick, handle 20 does not move in any direction independent of movement of base unit 12 during normal operation.

In the preferred embodiment, handle 20 is made up of handle section 20a and handle section 20b. As will be described in more detail later, the width of handle 20 is adjustable by adjusting the distance between handle sections 20a and 20b. Handle 20 contains switches 21–23. Switch 21 is positioned for activation by the index finger of a user's hand. Likewise, switch 22 is positioned for activation by the middle finger of a user's hand, and switch 23 is positioned for activation by the ring finger of a user's hand. While three switches are shown, anywhere from 1 to 4 switches could be used. A fifth switch could even be added on the top of the handle for activation by the thumb. In some embodiments, where the electronic device connected to input device 10 only requires positional information from input device 10, handle 20 may not need to contain any switches.

Base unit 12 also contains, in the preferred embodiment, indented area 15 that conforms to the shape of the edge of a human hand curled about handle 20 from the small finger to the wrist. Note that indented area 15 conforms to the shape of the edge of either the left or the right hand, making input device 10 equally suitable for either left or right handed users. One alternate embodiment dispenses with indented area 15 altogether, while another alternate embodiment just contains a portion of indented area 15 for either left hand or right hand use. Still another alternate embodiment encases indented area 15 in foam padding or other type of pliable material to better conform to the shape of the edge of a user's hand.

Figure 2A:
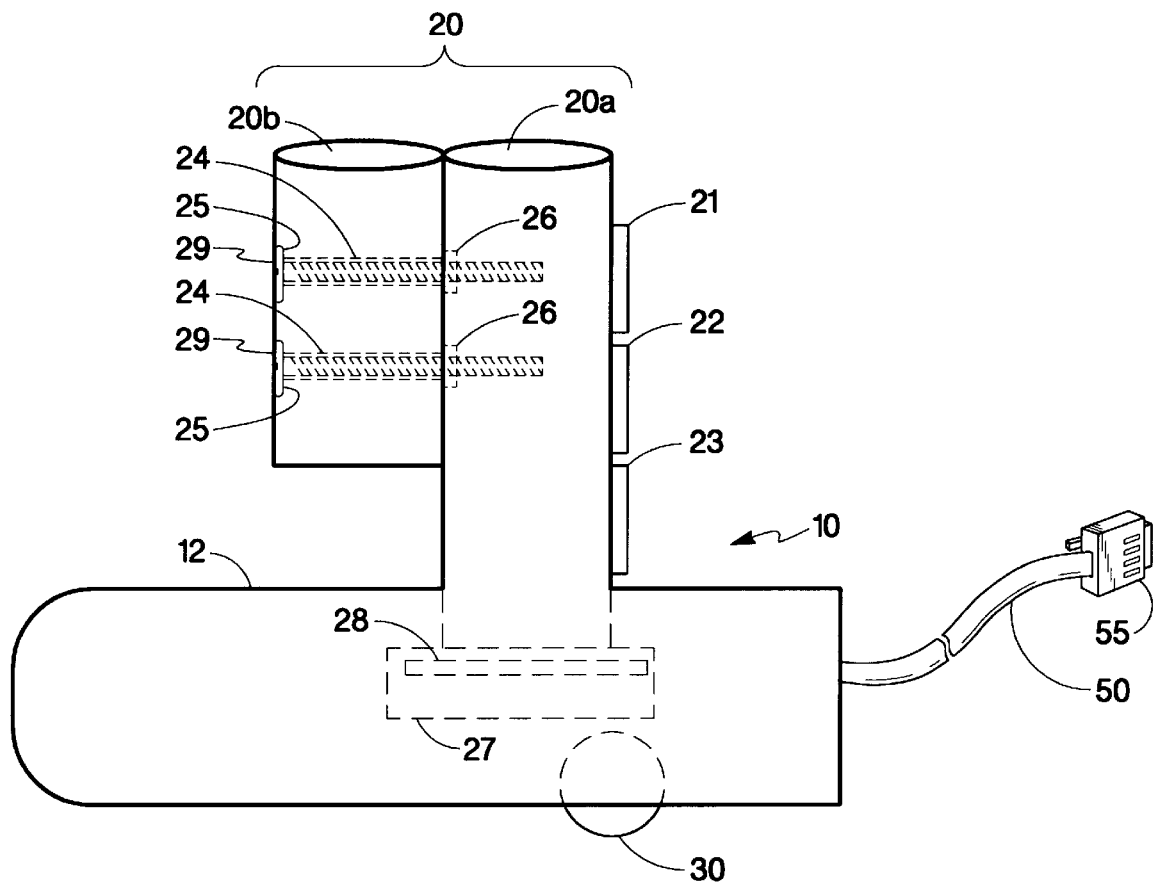
FIG. 2A shows a side view of the input device of the preferred embodiment of the invention.

FIG. 2A shows a side view the input device of the preferred embodiment of the invention. In addition to the components discussed above, FIG. 2A shows position ball 30. Like a conventional mouse, position ball 30 is rotateably secured to the bottom of base unit 12 so that a portion of position ball 30 protrudes from the bottom of base unit 12. This allows position ball 30 to roll as input device 10 moves in the x and y directions.

Figure 2B:
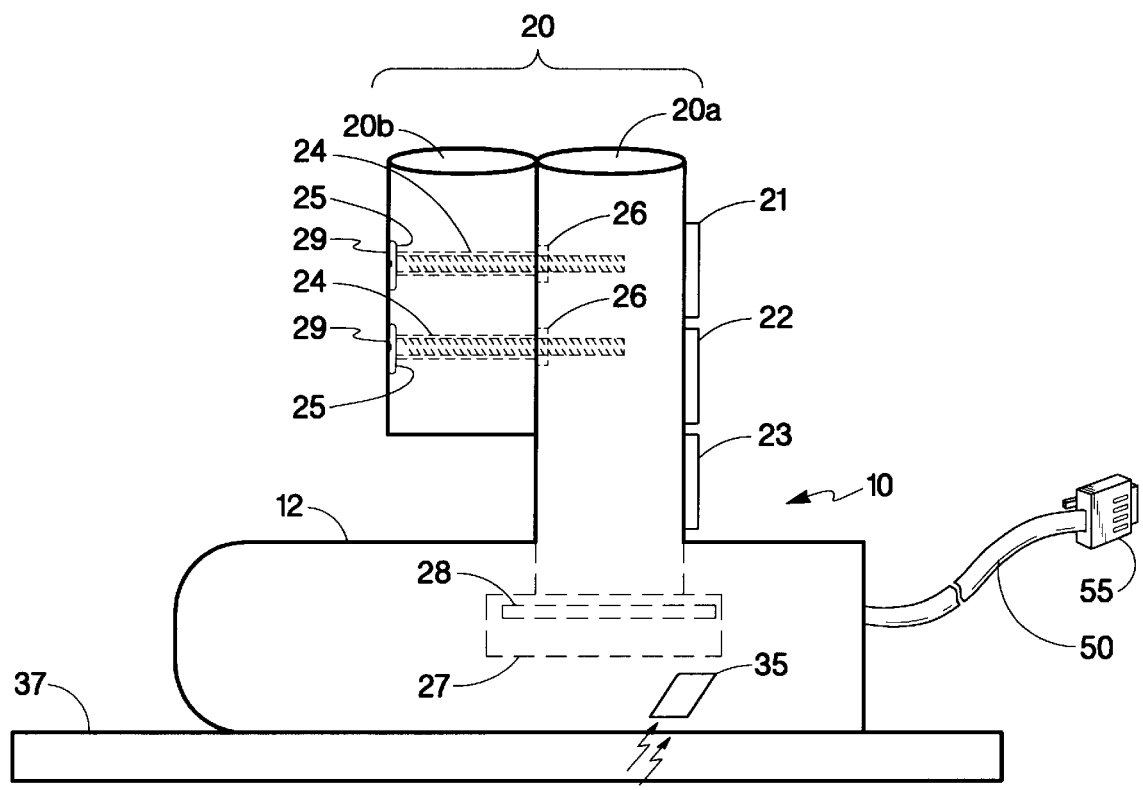
FIG. 2B shows a side view of the input device of an alternate embodiment of the invention.

In an alternate embodiment shown in FIG. 2B, position ball 30 is replaced by optical sensor 35. Optical sensor 35 is capable of sensing grid pattern 37 underneath input device 10.

Referring again to FIG. 2A, the width of handle 20 is adjustable by adjusting the distance between handle portion 20a and handle portion 20b. This adjusting mechanism is made up of tubes 24, screws 25 and nuts 26. Screws 25 connect handle portion 20a with handle portion 20b. Screws 25 go through tubes 24, which are affixed via epoxy or other means to the interior of handle portion 20b, and nuts 26, which are affixed via epoxy or other means to the interior of handle portion 20a. The tops of screws 25 are accessible by the user via holes 29 in handle portion 20b. The diameter of holes 29 is smaller than the diameter of the tops of screws 25. When the user inserts a screwdriver into holes 29 and rotates screws 25 in a counterclockwise direction, the distance between handle portion 20a and handle portion 20b increases, thereby increasing the width of handle 20. When screws 25 are rotated in a clockwise direction, the distance between handle portion 20a and handle portion 20b decreases, thereby decreasing the width of handle 20.

The length of handle 20 is adjusted by increasing or decreasing the amount by which handle portion 20a extends into cavity 27 of base unit 12. The top portion of cavity 27 is of sufficient circumference so that handle portion 20a is friction fit into cavity 27 of base unit 10. Cavity 27 has sufficient depth to allow for the movement of handle 20 within cavity 27. If the user wants to make handle 20 shorter, he simply pushes handle portion 20a further into cavity 27. If the user wants to make handle 20 longer, he pulls handle portion 20a further out of cavity 27. Bottom portion of cavity 27 is wider than top portion of cavity 27 to accommodate stop 28. When handle portion 20a is at its maximum length, stop 28 press against the top portion of cavity 27, thereby assuring that handle 20 cannot be pulled completely out of base unit 12. In the preferred embodiment, stop 28 is a annular ring having a circumference greater than the circumference of handle portion 20a, although multiple studs could also be used.

The orientation of handle 20 is adjusted by rotating handle portion 20a in a clockwise or counterclockwise direction within cavity 27. The construction of cavity 27 (i.e. the circumference of the top portion being slightly larger than the circumference of the handle, the circumference of the bottom portion being larger than the circumference of the stop) allows stop 28 to rotate freely within the bottom portion of cavity 27, yet still maintains a friction fit with handle 20 in the top portion of cavity 27. While the construction of cavity 27 would allow handle 20 to be rotated a full 360°, a right handed user would more typically desire a small displacement of approximately +10°, while a left handed user would more typically desire a displacement of approximately −10°.

Figure 3:
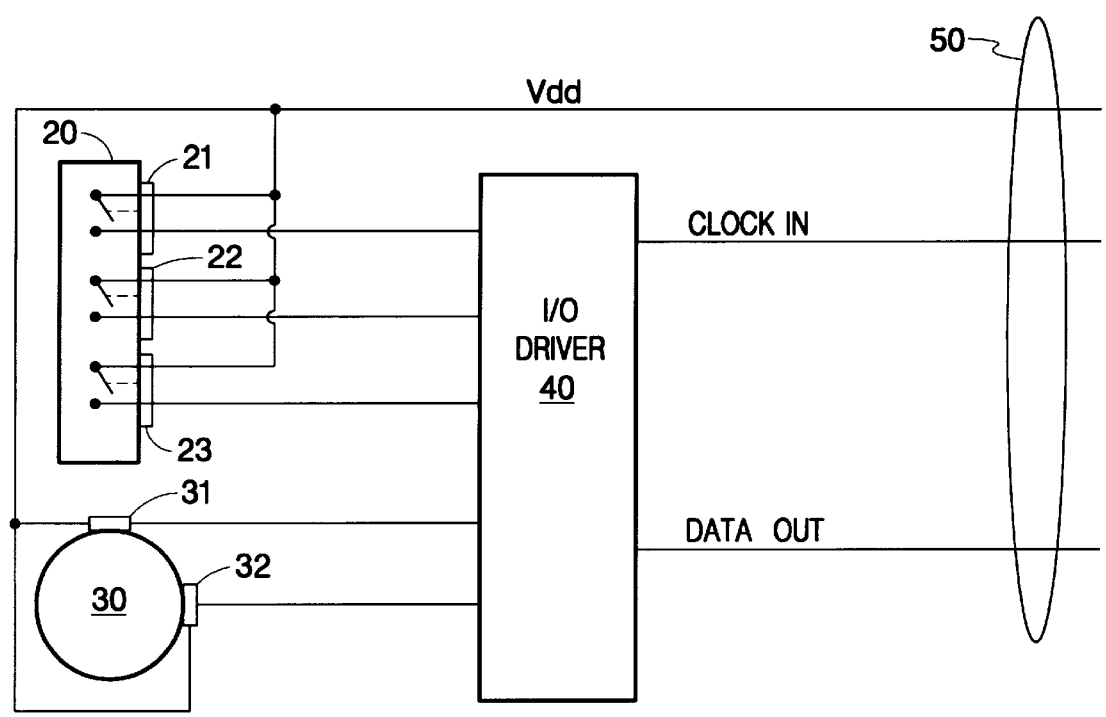
FIG. 3 shows a block diagram of the circuitry of the input device of the preferred embodiment of the invention.

FIG. 3 shows a block diagram of the circuitry of the input device of the preferred embodiment of the invention. As position ball 30 rolls, vertical roller 31 detects the relative change in vertical (y) position of input device 10 in a manner conventional to a typical computer mouse. Likewise, horizontal roller 32 detects the relative change in horizontal (x) position of input device 10 in a manner conventional to a typical computer mouse. In the alternate embodiment shown in FIG. 2B, where optical sensor 35 is used, position ball 30, horizontal roller 31 and horizontal roller 32 are replaced by optical sensor 35 capable of determining x and y position based on detection of grid pattern 37 under input device 10.

Switch 21, when activated, sends a high logic level signal ($V_{dd}$ from the computer) to I/O driver 40. Likewise, switches 22 and 23, when activated, send a high logic level signal to I/O driver 40.

In addition to the state of switches 21–23, the x and y positional information is also sent to I/O driver 40. In the preferred embodiment, I/O driver 40 sends the x-y positional and switch state information to a computer via cable 50 using a specific clocked protocol, such as RS-232 serial protocol, understandable by the computer. Those skilled in the art will appreciate that the protocol used is highly dependent on the type of computer used, and that a single computer can even support multiple protocols (i.e. serial and bus mouse).

What is claimed is:

1. An input device, comprising:

a base unit movable in an x direction and a y direction;

a position detection mechanism for detecting movement of said base unit in said x direction and said y direction;

a handle attached to the top of said base unit, said handle having a sufficient length and width to accommodate at least three fingers of a human hand curled about it when the wrist of said human hand is positioned perpendicularly to said base unit; said handle having a first handle section and a second handle section; said human hand having an index finger, a middle finger, a ring finger, a small finger, and a thumb;

a width adjusting mechanism for adjusting the distance between said first handle section and said second handle section; and said handle further comprising a first switch, said first switch capable of being activated by said index finger of said human hand when said human hand is curled about said first handle section and said second handle section and said wrist is positioned perpendicularly to said base unit.

2. The input device of claim 1, wherein said handle further comprises:

a second switch, said second switch capable of being activated by said middle finger of said human hand when said human hand is curled about said handle and said wrist is positioned perpendicularly to said base unit.

3. The input device of claim 1, wherein the top of said base unit conforms to the shape of the edge of a human hand curled about said handle from the small finger of said human hand to the wrist.

4. The input device of claim 1, further comprising:

a position ball rotateably secured to the bottom of said base unit so that a portion of said position ball protrudes from the bottom of said base unit, said position ball operatively coupled to said position detection mechanism.

5. The input device of claim 1, further comprising:

an optical sensor for sensing a grid pattern positioned underneath said bottom of said base unit, said optical sensor operatively coupled to said position detection mechanism.

6. The input device of claim 1, wherein said handle further comprises:

a second switch, said second switch capable of being activated by said thumb of said human hand when said human hand is curled about said handle and said wrist is positioned perpendicularly to said base unit.

7. The input device of claim 2, wherein said handle further comprises:

a third switch, said third switch capable of being activated by said thumb of said human hand when said human hand is curled about said handle and said wrist is positioned perpendicularly to said base unit.

8. The input device of claim 2, wherein said handle further comprises:
a third switch, said third switch capable of being activated by said ring finger of said human hand when said human hand is curled about said handle and said wrist is positioned perpendicularly to said base unit.

9. The input device of claim 8, wherein said handle further comprises:
a fourth switch, said fourth switch capable of being activated by said thumb of said human hand when said human hand is curled about said handle and said wrist is positioned perpendicularly to said base unit.

10. The input device of claim 8, wherein said handle further comprises:
a fourth switch, said fourth switch capable of being activated by said small finger of said human hand when said human hand is curled about said handle and said wrist is positioned perpendicularly to said base unit.

11. The input device of claim 10, wherein said handle further comprises:
a fifth switch, said fifth switch capable of being activated by said thumb of said human hand when said human hand is curled about said handle and said wrist is positioned perpendicularly to said base unit.

12. The input device of claim 3, wherein said top of said base unit is made of a pliable material.

13. The input device of claim 12, wherein said pliable material is foam padding.

14. A method of using an input device having a base unit movable in an x direction and a y direction, a position detection mechanism for detecting movement of said base unit in said x direction and said y direction, and a handle attached to the top of said base unit, said base unit having a top portion, said handle having a first switch, a first handle section, a second handle section, and a width adjusting mechanism to accommodate a human hand curled about said first section and said second section of said handle, said human hand having a wrist, and index finger, a middle finger, a ring finger, a small finger, and a thumb, said method comprising the steps of:

adjusting said width adjusting mechanism to adjust a distance between the first handle section and the second handle section;

placing said human hand on the top portion of said base unit such that said wrist is perpendicular to said base unit, and such that the small finger of said hand is the nearest finger to said base unit;

curling the small finger, the ring finger, the middle finger and the index finger of said human hand around said first and second handle sections;

moving the base unit in said x direction an in said y direction; and activating said first switch with the index finger.

15. The method of claim 14, wherein said handle further comprises a second switch, further comprising the step of:
activating said second switch with said middle finger.

16. The method of claim 14, wherein said handle further comprises a second switch, further comprising the step of:
activating said second switch with said thumb.

17. The method of claim 15, wherein said handle further comprises a third switch, further comprising the step of:
activating said third switch with said thumb.

18. The method of claim 15, wherein said handle further comprises a third switch, further comprising the step of:
activating said third switch with said ring finger.

19. The method of claim 18, wherein said handle further comprises a fourth switch, further comprising the step of:
activating said fourth switch with said thumb.

20. The method of claim 18, wherein said handle further comprises a fourth switch, further comprising the step of:
activating said fourth switch with said small finger.

21. The method of claim 20, wherein said handle further comprises a fifth switch, further comprising the step of:
activating said fifth switch with said thumb.

22. The method of claim 14 wherein said base unit further has a cavity constructed to allow said handle to friction fit yet rotate within said cavity, further comprising the step of:
adjusting the rotational orientation of said handle by rotating said handle in said cavity.

\* \* \* \* \*